United States Patent
Milner et al.

(10) Patent No.: US 8,535,590 B2
(45) Date of Patent: Sep. 17, 2013

(54) SPRAY SYSTEM AND METHOD OF MAKING PHASE SEPARATED POLYMER MEMBRANE STRUCTURES

(75) Inventors: Keith R. Milner, Lafayette, IN (US); Matthew S. Huser, Lafayette, IN (US)

(73) Assignee: Cook Medical Technologies LLC, Bloomington, IN (US)

( * ) Notice: Subject to any disclaimer, the term of this patent is extended or adjusted under 35 U.S.C. 154(b) by 92 days.

(21) Appl. No.: 13/005,090

(22) Filed: Jan. 12, 2011

(65) Prior Publication Data

US 2012/0179237 A1 Jul. 12, 2012

(51) Int. Cl.
*A61F 2/82* (2013.01)
*B05B 5/025* (2006.01)
*B05C 5/00* (2006.01)
*B05D 1/02* (2006.01)

(52) U.S. Cl.
USPC .......... 264/309; 264/310; 623/1.15; 424/423

(58) Field of Classification Search
USPC ............... 264/309, 310; 623/1.15, 2.24, 920, 623/23.7; 424/423
See application file for complete search history.

(56) References Cited

U.S. PATENT DOCUMENTS

| | | | | |
|---|---|---|---|---|
| 3,284,009 A | * | 11/1966 | Stull et al. | 239/427 |
| 7,335,265 B1 | * | 2/2008 | Hossainy | 118/504 |
| 7,374,774 B2 | * | 5/2008 | Bowlin et al. | 424/423 |
| 7,556,837 B2 | * | 7/2009 | Hossainy | 427/2.24 |
| 2002/0091433 A1 | * | 7/2002 | Ding et al. | 623/1.2 |
| 2005/0015046 A1 | * | 1/2005 | Weber et al. | 604/96.01 |
| 2005/0073075 A1 | * | 4/2005 | Chu et al. | 264/465 |
| 2008/0157440 A1 | * | 7/2008 | Hovanec et al. | 264/466 |
| 2008/0167724 A1 | * | 7/2008 | Ruane et al. | 623/23.7 |
| 2008/0217807 A1 | * | 9/2008 | Lee et al. | 264/172.18 |
| 2010/0318049 A1 | * | 12/2010 | Meyer et al. | 604/366 |
| 2011/0270411 A1 | * | 11/2011 | Yang et al. | 623/23.72 |
| 2012/0064165 A1 | * | 3/2012 | Koopman | 424/489 |
| 2013/0026255 A1 | * | 1/2013 | Hamman | 239/461 |

OTHER PUBLICATIONS

Fabrication of Microporous Polyurethane by Spray Phase Inversion Method as Small Diameter Vascular Grafts Material—M.T. Khorasani and S. Shorgashti—Published online Jan. 3, 2006 in Wiley InterScience (www.interscience.wiley.com).
Fabrication of Microporous Thermoplastic Polyurethane for Use as Small-Diameter Vascular Graft Material. I. Phase-Inversion Method—M.T. Khorasani and S. Shorgashti—Published online Sep. 13, 2005 in Wiley InterScience (www.interscience.wiley.com).

(Continued)

*Primary Examiner* — Joseph S Del Sole
*Assistant Examiner* — Nahida Sultana
(74) *Attorney, Agent, or Firm* — Brinks Hofer Gilson & Lione

(57) ABSTRACT

A spray system and method of using such spray system to fabricate a polymer membrane structure for use as a vascular graft or tissue engineered scaffold is provided. Generally, this spray system includes the use of at least two spray apparatus to apply different polymer and solvent mixtures to the outer surface of a mandrel to form a blended layer. Upon curing of the blended layer, phase separation occurs leading to the formation of a polymer membrane structure having variable properties along at least a portion of its longitudinal axis.

12 Claims, 2 Drawing Sheets

(56) References Cited

OTHER PUBLICATIONS

Porous Biodegradable Polymeric Scaffolds Prepared by Thermally Induced Phase Separation—Yoon Sung Nam and Tae Gwan Park—Department of Biological Sciences, Korea Advanced Institute of Science and Technology—373-1 Kusong-dong Yusong-gu, Taejon 305-701, South Korea, (Feb. 25, 1999).

Polyurethane/poly(lactic-co-glycolic) Acid Composite Scaffolds Fabricated by Thermally Induced Phase Separation—A.S. Rowland, S.A. Lim, D. Martin—J.J. Cooper White—Accepted 31 Dec. 31, 2006—Available online Jan. 16, 2007.

* cited by examiner

SPRAY SYSTEM AND METHOD OF MAKING PHASE SEPARATED POLYMER MEMBRANE STRUCTURES

FIELD

This disclosure relates generally to polymer constructs for use as implantable medical prostheses, such as tissue engineered scaffolds, vascular grafts, or covered stents, among others. More specifically, this disclosure relates to a spray system and method of making phase separated polymer or membrane structures.

BACKGROUND

Phase separation is a technique in which controlled separation of a polymer solution into two phases is used to form a membrane structure. Different forms of phase separation include thermal separation, immersion or coagulation precipitation, vapor phase separation, and liquid-liquid separation. In thermal phase separation, the separation occurs when a homogeneous polymer solution is cooled, resulting in the formation of polymer-rich and polymer-lean phases. In immersion precipitation, a polymer solution is immersed in a liquid non-solvent bath. In this case, phase separation occurs as the solvent is exchanged for the non-solvent liquid. In vapor phase separation, the separation is induced by penetration of a non-solvent vapor into a polymer solution. Finally, in liquid-liquid phase separation: the polymer is dissolved in a mixture of a volatile solvent and a less volatile non-solvent (i.e. a polymer-solvent/non-solvent mixture). During solvent evaporation, polymer solubility decreases, and phase separation occurs.

Phase separation is a process that can be used to produce polymer membranes or constructs that can be used as engineered scaffolds or vascular grafts, as well as coverings/grafts for vascular stents. However, all of the forms of phase separation described above result in a construct or membrane having a single uniform structure. The single uniform structure of the membrane arises from the membrane being prepared using a single liquid mixture having one polymer-solvent/non-solvent ratio. In addition, the preparation of liquid-liquid phase separated constructs is further complicated by a) the ongoing separation of the polymer-solvent/non-solvent mixture during the process of casting and b) the need to prevent the formation of an immersion or coagulation precipitate when adding the non-solvent to the polymer-solvent mixture.

Accordingly, there exists a desire to provide vascular grafts and tissue engineering scaffolds that have variable porosity and variable surface properties. More particularly, there exists a desire for the development of a manufacturing or fabrication process for polymer constructs that would allow for such variable properties in different regions of the polymer membrane structure of the constructs.

SUMMARY

In satisfying the above need, as well as overcoming the enumerated drawbacks and other limitations of the related art, the present disclosure generally provides a system and method of fabricating a polymer membrane structure for use as an implantable medical prosthesis, including but not limited to, a vascular graft or tissue engineered scaffold, as well as a covering/graft for a vascular stent or the like. The method includes providing a first fluid mixture, comprising a first polymer material dissolved in a first solvent and a second fluid mixture comprising one selected from the group of a second polymer material dissolved in the first solvent, the second polymer material dissolved in a second solvent, or the second solvent. The first and second fluid mixtures are placed in communication with a first and second spray apparatus, respectfully. A mandrel having an outer surface and a longitudinal axis is then positioned such that the first and second spray apparatus can apply the fluid mixtures to at least a portion of the outer surface of the mandrel, such that the two fluid mixtures are in contact with one another. A blended layer is formed on the surface of the mandrel through the interaction of the two fluid mixtures. The curing of this blended layer is done such that the blended layer undergoes phase separation to form a polymer membrane structure. The polymer membrane structure may then be removed from the mandrel and used as a polymer construct. This fabrication method may optionally comprise a step that involves the removal of at least one selected from the second polymer material and second solvent after phase separation has occurred in the blended layer, thereby, creating a porous polymer membrane structure. This fabrication method may optionally comprise a step that involves positioning a stent on the mandrel before, during or after applying the fluid mixtures such that the cured polymer membrane structure is attached to or encompasses the stent.

According to one aspect of the present disclosure, the mandrel is in communication with a mechanism capable of rotating the mandrel around its longitudinal axis. In addition, the mandrel or the spray apparatus are in communication with another mechanism capable of linearly translating the mandrel or the spray apparatus along the mandrel's longitudinal axis. The first and second spray apparatus are preferably positioned such that they both will spray upon the same surface area of the mandrel.

According to another aspect of the present disclosure the second fluid mixture utilizes a solvent that is a non-solvent for the polymer material in the first fluid mixture. Preferably, the solvent in the second fluid mixture is less volatile than solvent in the first fluid mixture. In addition, the first and second fluid mixtures exhibit at least one predetermined physical property selected from the group of dynamic surface tension, extensional viscosity, and shear viscosity. Preferably, the first fluid mixture and second fluid mixture may use, but not be limited to, polyether-urethane urea (PEUU) as the first polymer material, dimethyl acetamide as the first solvent, poly(L-lactic acid) (PLLA) as the second polymer material, and dimethyl acetamide as the second solvent.

The spray apparatus is designed to utilize predetermined spray parameters to apply the first and second fluid mixtures to the surface of the mandrel. These spray parameters are selected such that the polymer membrane structure exhibits a variation in at least one of its thickness, chemical properties, and mechanical properties along at least a portion of its length. The predetermined spray parameters include at least one selected from the group of nozzle type and orifice size, fluid pressure, shaping air, electrostatic charge, distance between the spray apparatus and the surface of the mandrel, and the angle upon which the spray will impinge upon the mandrel's surface.

According to yet another aspect of the present disclosure, a spray system for fabricating a polymer membrane structure according to the method described above is provided. This spray system generally comprises a mandrel having an outer surface and a longitudinal length; at least two spray apparatus with each spray apparatus positioned to spray a fluid mixture upon the outer surface of the mandrel; a first mechanism capable of moving the mandrel or the spray apparatus along the length of the mandrel's longitudinal axis; and a second mechanism capable of rotating the mandrel around its longitudinal axis. The spray apparatus is capable of spraying the fluid mixtures using a technique selected as one from the group of ultrasonic atomization, air spray, airless spray, air-assisted airless spray, HVLP (high volume low pressure) spray, and electrostatic spray.

According to yet another aspect of the present disclosure, a polymer membrane structure having a longitudinal axis is provided for use as a vascular graft or tissue engineered scaffold. This polymer membrane structure, which is fabricated using the previously described spray method and system, exhibits a variation in at least one of its thickness, chemical properties, and mechanical properties along at least a portion of its longitudinal axis. Alternatively, the properties of the polymer membrane structure may exhibit variation throughout at least a portion of its cross section, e.g., perpendicular to its longitudinal axis. For example, variation of the spray parameters may be used to form a polymer membrane structure with a highly porous inner surface and a dense or minimally porous outer surface, among other possibilities.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
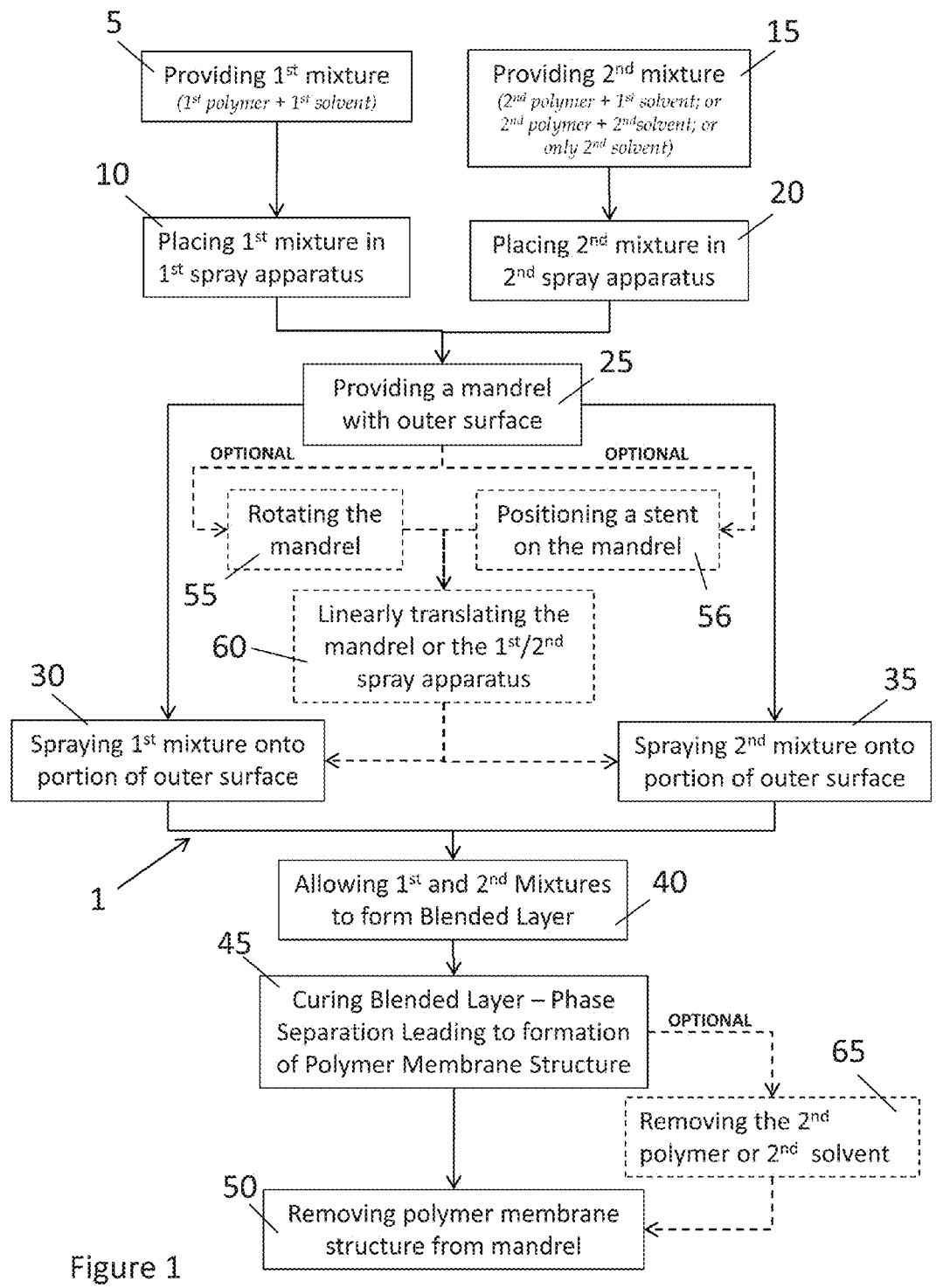
FIG. 1 is a schematic representation of a method for fabricating a polymer membrane structure for use as a vascular graft or tissue engineered scaffold according to the teachings of the present disclosure.

The following description is merely exemplary in nature and is in no way intended to limit the present disclosure or its application or uses. It should be understood that throughout the description and drawings, corresponding reference numerals indicate like or corresponding parts and features.

The present disclosure generally provides a method for coating a surface or mandrel with a combination of a first polymer material, a fluid that is a solvent for the first polymer material, and a fluid that is a non-solvent for the first polymer material or a second polymer material chosen to allow or encourage phase separation to occur with the first polymer material. One skilled-in-the-art will understand that the second polymer material may also be dispersed in a fluid that is a non-solvent for the first polymer material. The coating method further comprises at least two spray apparatus, each designed to spray at least one of these four components.

The use of multiple spray apparatus isolates the various components until they are applied to the targeted surface of a mandrel, thereby, allowing the ratio of the components to be altered on different regions of the targeted surface to create a coating having variable properties in different regions. By way of example, this may be accomplished by varying the spray parameters (flow rate, spray distance, etc) during the coating process. This would not be feasible if the surface of the mandrel was simply dip-coated with a polymer-solvent/non-solvent combination or sprayed from a single spray apparatus.

The use of multiple spray apparatus allows incompatible components to be segregated until they are coated on to the targeted surface. The method of the present disclosure permits polymer-solvent/non-solvent combinations to be chosen that would result in spontaneous coagulation if mixed together prior to coating. Thus this method can result in a reduction in manufacturing costs by minimizing the need to frequently prepare a mixture or blend of the multiple components in order to circumvent the occurrence of phase separation prior to the application of a coating on to the targeted surface of a mandrel.

Referring to FIG. 1, the method 1 provides 5 a first fluid mixture comprising a first polymer and a first solvent. The first fluid mixture is placed 10 into a first spray apparatus. A second fluid mixture is also provided 15, which is comprised of either (i) a second polymer dissolved in the first solvent, (ii) a second polymer dissolved in a second solvent; or (iii) only the second solvent. This second fluid mixture is placed 20 into a second spray apparatus. A mandrel is provided 25 having an outer surface upon which the first fluid mixture is sprayed 30 and the second fluid mixture is sprayed 35 until a portion of the outer surface is coated. The first and second fluid mixtures are allowed 40 to interact and form a blended layer. The blended layer is cured 45 during which time phase separation occurs leading to the formation of a polymer membrane structure shaped to conform to the outer surface of the mandrel. The polymer membrane structure is then removed 50 from the mandrel. Optionally, the method may include the rotation 55 of the mandrel in order to spray the fluid mixtures around the mandrel, as well as a means to linearly translate 60 one selected from the group of the mandrel and at least one of the spray apparatus along the length of the mandrel's longitudinal axis. The method may also include a step 65 in which at least one of the second polymer material and second solvent is removed, thereby, resulting in a polymer membrane structure that is porous in nature. Alternatively, the method may optionally include a step that involves positioning 56 a stent on the mandrel before, during, or after applying the fluid mixtures such that the cured polymer membrane structure is attached to or encompasses the stent.

According to one aspect of the present disclosure, a polymer may be chosen along with a fluid that is a solvent for this polymer and a fluid that is a non-solvent for the polymer, with the solvent being more volatile than the non-solvent. The dissolved polymer solution and the non-solvent are used to coat the surface of a mandrel. As the solvent evaporates, the polymer solubility decreases, resulting in phase separation between the polymeric and non-solvent phases which leads to the formation of a porous membrane structure.

According to another aspect of the present disclosure, two polymers may be chosen with a single fluid that acts as a solvent for both polymers. These two solutions are used to coat the surface of a mandrel. During a curing stage, which is designed to remove the solvent component, phase separation of the two polymers occurs, resulting in the formation of a construct containing some regions rich in the first polymer and some regions rich in the second polymer. These polymers are chosen to provide the construct with desirable properties (e.g. mechanical, hemocompatibility, biocompatibility, etc.). Furthermore, one of the polymers may then be removed to create a porous structure.

Figure 2A:
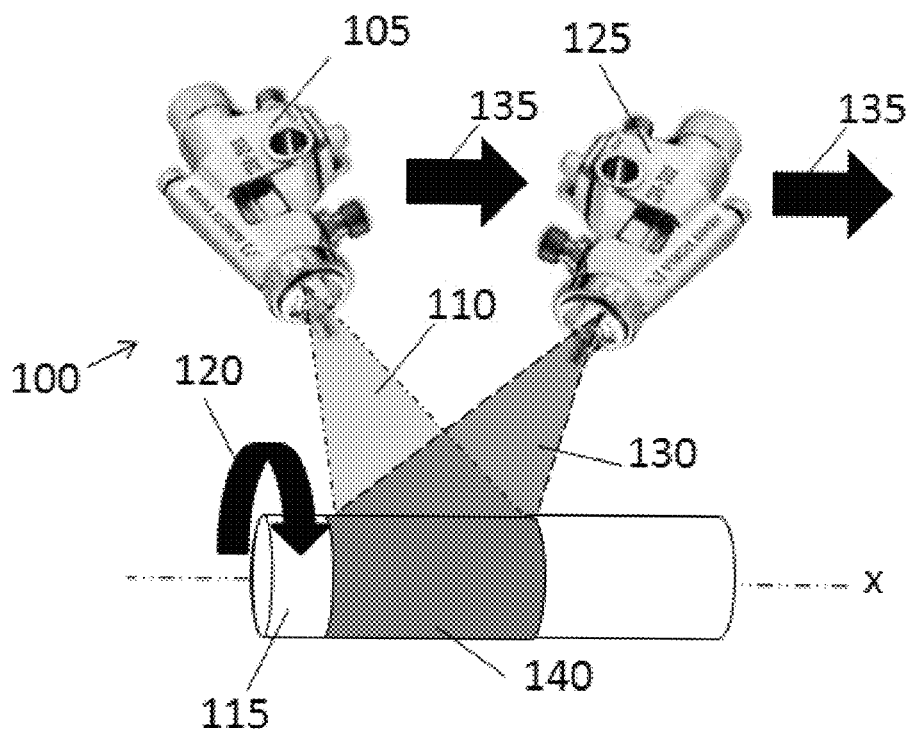
FIG. 2A is a schematic representation of a spray system applying a blended layer to a mandrel according to one aspect of the present disclosure.
Figure 2B:
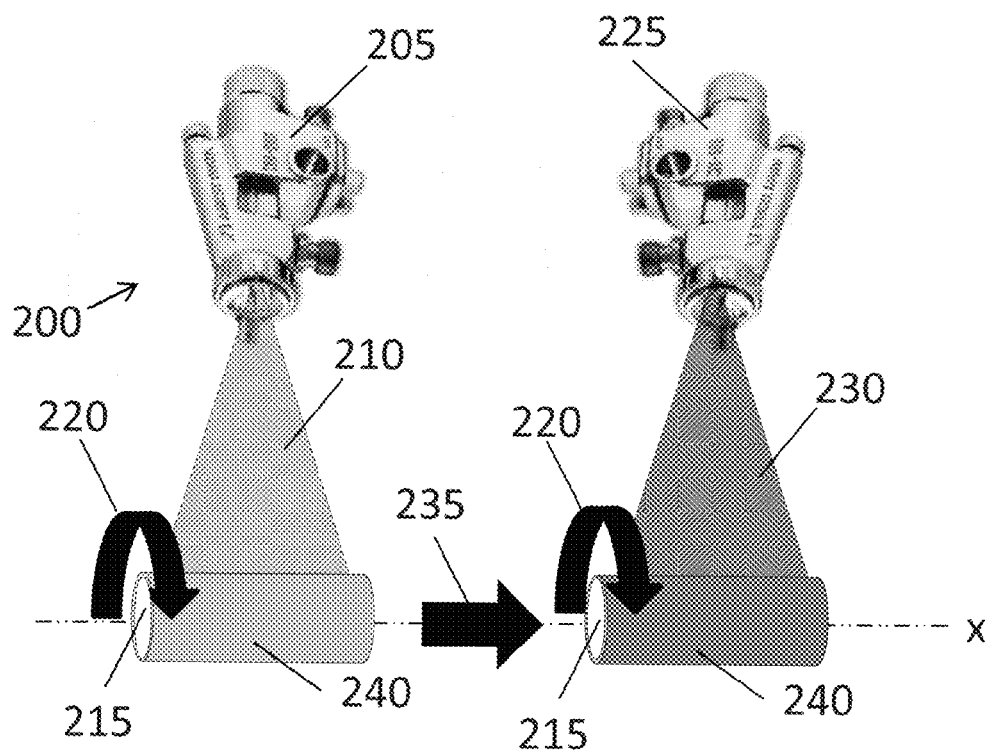
FIG. 2B is a schematic representation of a spray system applying a blended layer to a mandrel according to another aspect of the present disclosure.

Referring now to FIGS. 2A and 2B, two spray systems among multiple possible system configurations are shown. In FIG. 2A, the spray system 100 provides a first spray apparatus 105 and a second spray apparatus 125 that are positioned to spray a first fluid mixture 110 and a second fluid mixture 130, respectfully, upon the same surface area 140 of the mandrel 115. In this case, at least one of the spray apparatus 105, 125 is in communication with a first mechanism 135 capable of actuating the spray apparatus linearly along the length of the longitudinal axis x of the mandrel 115 in order to apply the first 110 and second 130 fluid mixtures to a larger portion of the surface area 140 of the mandrel 115. The mandrel is also in communication with a second mechanism 120 capable of rotating the mandrel around its longitudinal axis x in order to allow the first 110 and second 130 fluid mixtures to be applied around the entire mandrel 115.

In FIG. 2B, a spray system 200 is provided in which both the first 205 and second 225 spray apparatus are fixed in position. In this scenario, the mandrel 215 is capable of both being rotated 220 around its longitudinal axis x and linearly actuated 235 along the length of the longitudinal axis x in order to allow the first spray apparatus 205 and second spray apparatus 225 to apply a first fluid mixture 210 and second fluid mixture 230, respectfully, to the surface 240 of the mandrel 215. One skilled-in-the-art will understand that the spray systems shown in FIGS. 2A and 2B are two examples, and that other configurations may be utilized without exceeding the scope of the present disclosure.

The polymers used in the present disclosure may include any polymer system known to one skilled-in-the-art to undergo polymer phase separation. Examples of such polymer systems include, but are not limited to, polyurethane, polysiloxane, polyether-urethane urea, polyamino acids, cellulose derivatives, polyglycolic acid (PGA), polylactic acid (PLA), polylactic acid-glycolic acid copolymer (PLGA), poly-E-caprolactone (PCL), polyanhydride, polyorthoester derivatives, and copolymers or mixtures thereof. Preferably, the polymer system is selected to be either biocompatible or biodegradable. One skilled-in-the-art will understand that a mixture of biocompatible and non-biocompatible polymer systems may be utilized to form a porous polymer membrane structure in which the porous nature of the membrane results from removal of the non-biocompatible polymer system.

The fluid used as a solvent to dissolve the biodegradable polymer systems used in the first and/or second fluid mixtures may include, but not be limited to, tetrahydrofuran (THF), dimethylsulfoxide (DMSO), dimethylformamide (DMF), low molecular weight dioxanes, methylene chloride, chloroform, dichloromethane, and mixtures or combinations thereof. The fluid used as a non-solvent for the biodegradable polymer systems may include any fluid known to one skill-in-the-art that does not dissolve the polymer but is miscible with the chosen solvent. Such fluids include, for example, water, alcohols (e.g., methanol, ethanol, etc.), acetone, and mixtures thereof, among others. When a solvent and non-solvent are both utilized to form a blended layer on a mandrel, the ratio of solvent to non-solvent in the blended layer may include any ratio that will result in phase separation, with such ratio including, but not being limited to, a range of about 75:25 to 95:5.

The mandrel, upon whose outer surface the first and second fluid mixtures are applied, may be comprised of any suitable material known to one skilled-in-the-art. Such suitable materials may include but not limited to, metals (e.g., titanium), metal composites or alloys, ceramic composites; polymeric or organic composites, and mixtures or combinations thereof. The outer surface of the mandrel is predetermined to be chemically resistant to the polymers, solvents, and non-solvents used in the first and second fluid mixtures. The surface of the mandrel can be any shaped surface, with such shapes including cylindrical, square, rectangular, and triangular, among others. Optionally, the mandrel may be rotated around its longitudinal axis and/or translated along its longitudinal axis during the spray process.

The term "spray" or "sprayed" is used to refer to the formation of discrete droplets (e.g., atomization) by accelerating a fluid stream of the first or second fluid mixture to the point where it experiences abrupt expansion. One means to achieve this expansion is to force the fluid through an orifice. In this case, the velocity of the fluid as it exits the orifice causes the fluid to break-up into droplets. Another means to form such droplets is through the introduction of ultrasonic energy or air into the flowing fluid near or at the location where the fluid exits the spray apparatus (e.g., the nozzle). One skilled-in-the-art will understand that any known technique for the atomization of a fluid into droplets may be selected for use in the present disclosure. Such techniques include the use of spray guns or apparatus associated with ultrasonic atomization, air spray, airless spray, air-assisted airless spray, HVLP (high volume low pressure) spray, and electrostatic spray, among others.

The spray system and method of the present disclosure is preferably optimized to deliver the spray droplets to the surface of the mandrel while retaining a substantial amount of solvent or non-solvent within the droplets. Droplets that are comprised of a large amount of solvent or non-solvent will generally exhibit a relatively low viscosity, which assists the fluid in spreading across the surface to form a continuous film or layer on the mandrel.

The thickness and other properties exhibited by the blended layer as applied to the surface of the mandrel are dependent upon a variety of predetermined spray parameters. These predetermined spray parameters are selected to provide the blended layer with the thickness and properties necessary to undergo phase separation and form a polymer membrane structure on the surface of the mandrel. The spray parameters are preferably selected such that the resulting membrane structure will exhibit a variation in at least one of its thickness, chemical properties, or mechanical properties along at least a portion of its length. These spray parameters may include the type of nozzle used on the spray apparatus (e.g., size of the orifice), the pressure exerted by the fluid, the use of shaping air, the application of an electrostatic charge, the distance the spray apparatus is positioned away from the surface of the mandrel, and the angle upon which the spray will impinge upon the mandrel's surface, among others. The spray pressure and orifice size can be used to regulate the flow rate of the fluid applied to the mandrel. In addition to the spray parameters, at least one of the physical properties exhibited by the first or second fluid mixture, such as dynamic surface tension, extensional viscosity, and shear viscosity, are preferably predetermined due to their affect on atomization and film formation.

Another object of the present disclosure is to provide a polymer membrane construct prepared according to the previously described process. This polymer membrane construct may be used as an implantable medical prosthesis, including but not limited to, a tissue engineered scaffold or vascular graft, as well as a graft/covering for a vascular stent or the like. The polymer membrane construct can comprise any regular or irregular shape, such as a cylinder, a ribbon, a disc, a wafer, or a sheet, as well as a variety of other shaped solids. The cross-section of the polymer membrane construct taken in a plane perpendicular to its longitudinal axis x may be in the form of a rectangle, triangle, semi-circular, or the like. When the polymer membrane construct is cylindrical in shape, the cylindrical membrane structure may be cut or separated longitudinally to provide a polymer structure resembling a sheet-like membrane.

The following specific example is given to further illustrate the invention and should not be construed to limit the scope of the invention.

EXAMPLE 1

A Polyether-Urethane Urea (PEUU) Construct

A solution of polyether-urethane urea (PEUU) in dimethyl acetamide is chosen as the polymer-solvent component and is used to feed a first spray apparatus. A solution of poly(L-lactic acid) (PLLA) in dimethyl acetamide is chosen as a second polymer-solvent component and is used to feed a second spray apparatus. When these two solutions are mixed, the two polymer components are known to undergo rapid phase separation. One skilled-in-the-art will understand that this rapid separation would generally limit the ability to coat surfaces and mandrels uniformly with a mixture of the two polymers.

The two spray apparatus are attached to a mounting block fixed on a linear actuator. The two apparatus are directed such that the two sprays are incident on the same region of the target surface. This is accomplished in this example by the use of a rotating cylindrical mandrel which is positioned such that the axis of the mandrel parallels the linear actuator.

The mandrel is sprayed with the two polymer solutions and is heated to a temperature exceeding 35° C. in a fume hood with flowing air to facilitate evaporation of the solvent. During the spraying process, the cylindrical mandrel is rotated to coat the circumference of the mandrel while the linear actuator is operated to move the spray apparatus along the mandrel axis to coat a chosen length of the mandrel.

The resultant blended layer comprises a mixture of PEUU and PLLA, the two polymer components having been applied separately and having undergone phase separation during the curing process, thereby creating regions rich in one or the other of the two polymers. The size of these domains will be a function of the droplet size created in the spray process, the concentrations of the two polymers used, the flow rates and spray distances used and the curing conditions. The flow rate may be varied through one or both of the spray apparatus during the spray or coating process to vary the ratio of PEUU to PLLA along the length of the cylindrical mandrel. Another modification to the system could allow variation of the spray distance during the coating process.

Following removal from the mandrel, the two polymers may be left as a composite construct designed to have advantageous morphological, mechanical and cell adhesion/growth supporting properties. Alternatively, one of the polymers may be removed by extraction, evaporation or freeze drying to leave a porous membrane structure. For instance, the PLLA may be removed by immersion in chloroform (or another liquid that is solvent for the PLLA but a non-solvent for the PEUU) to prepare a porous PEUU construct where the porosity may result in improved biocompatibility compared to a non-porous PEUU construct. Variation of the flow rates used during the coating process can be employed to vary the porosity created along the length, through the cross-section of the construct (e.g. porous ends to induce attachment in to tissue and non- or low-porous mid-section to seal an aneurysm; porous lumen to promote graft patency/endothelialization and non- or low-porous ablumen to seal an aneurysm or prevent restenosis), or a combination thereof.

A person skilled in the art will recognize that although the spray system and method of fabricating a polymer membrane structure described in the preceding examples utilizes two spray apparatus and two fluid mixtures, the use of more than two spray apparatus and fluid mixtures can be done when desirable without exceeding the scope of the present disclosure.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of fabricating a polymer membrane structure for use as an implantable medical prosthesis, the method comprising:
   providing a first fluid mixture; the first fluid mixture being a first polymer material dissolved in a first solvent;
   placing the first fluid mixture in communication with a first spray apparatus;
   providing a second fluid mixture; the second fluid mixture being one selected from the group of a second polymer material dissolved in the first solvent; the second polymer material dissolved in a second solvent; or the second solvent;
   placing the second fluid mixture in communication with a second spray apparatus;
   providing a mandrel having an outer surface and a longitudinal axis;
   applying the first fluid mixture to at least a portion of the outer surface of the mandrel by spraying said fluid mixture from the first spray apparatus;
   applying the second fluid mixture to at least a portion of the outer surface of the mandrel by spraying said fluid mixture from the second spray apparatus, such that the second fluid mixture contacts the first fluid mixture;
   allowing the second fluid mixture to interact with the first fluid mixture on the outer surface of the mandrel until a blended layer is formed;
   curing the blended layer; wherein during said curing, the blended layer undergoes phase separation to form a polymer membrane structure on the outer surface of the mandrel; and
   removing the polymer membrane structure from the outer surface of the mandrel; the polymer membrane having a defined thickness and length.

2. The method of claim 1 wherein, the steps of applying the first fluid mixture and the second fluid mixture to the mandrel's surface further includes rotation of the mandrel around its longitudinal axis.

3. The method of claim 2, wherein the steps of applying the first fluid mixture and second fluid mixture to the mandrel's surface further includes one selected from the group of moving at least one of the first and second spray apparatus and moving the mandrel along the length of the mandrel's longitudinal axis.

4. The method of claim 3, wherein the step of applying the second fluid mixture to the mandrel's surface comprises spraying the second fluid mixture onto substantially the same surface area of the mandrel upon which simultaneously the first fluid mixture is sprayed.

5. The method of claim 1, wherein the step of providing a mandrel further includes positioning a stent on the mandrel.

6. The method of claim 1, wherein the step of providing a second fluid mixture utilizes a second solvent that is a non-solvent for the first polymer material.

7. The method of claim 6, wherein the step of providing a second fluid mixture utilizes a second solvent that is less volatile than the first solvent.

8. The method of claim 1, wherein the steps of applying the first fluid mixture and second fluid mixture to the surface of the mandrel utilizes predetermined spray parameters, the spray parameters selected such that the polymer membrane structure exhibits a variation in at least one of its thickness, chemical properties, and mechanical properties along at least a portion of one selected from the group of its length, its cross-section perpendicular to said length, and a combination thereof.

9. The method of claim 8, wherein the spray parameters that are predetermined for the application of the first and second fluid mixtures include at least one of nozzle type and orifice size, fluid pressure, shaping air, electrostatic charge, distance between the spray apparatus and the surface of the mandrel, and the angle upon which the spray will impinge upon the mandrel's surface.

10. The method of claim 1, wherein the steps of providing a first fluid mixture and second fluid mixture uses first and second fluid mixtures having at least one predetermined physical property selected from the group of dynamic surface tension, extensional viscosity, and shear viscosity.

11. The method of claim 1, wherein the steps of providing a first fluid mixture and second fluid mixture uses polyetherurethane urea (PEUU) as the first polymer material, dimethyl acetamide as the first solvent, poly(L-lactic acid) (PLLA) as the second polymer material, and dimethyl acetamide as the second solvent.

12. The method according to claim 1, wherein the method further comprises the step of removing at least one selected from the second polymer material and second solvent after phase separation has occurred in the blended layer, thereby, resulting in a porous polymer membrane structure.

* * * * *